(12) United States Patent
Brown et al.

(10) Patent No.: US 7,937,260 B1
(45) Date of Patent: May 3, 2011

(54) CONCISE DYNAMIC GRAMMARS USING N-BEST SELECTION

(75) Inventors: Deborah W. Brown, Manalapan, NJ (US); Randy G. Goldberg, Princeton, NJ (US); Stephen Michael Marcus, Morristown, NJ (US); Richard R. Rosinski, Middletown, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 0 days.

(21) Appl. No.: 09/097,787

(22) Filed: Jun. 15, 1998

(51) Int. Cl.
*G10L 17/20* (2006.01)

(52) U.S. Cl. ............ 704/1; 704/231; 704/235; 704/270; 704/270.1

(58) Field of Classification Search ............... 704/1, 231, 704/235, 270, 270.1, 10, 246, 251; 379/88
See application file for complete search history.

(56) References Cited

U.S. PATENT DOCUMENTS

| | | | |
|---|---|---|---|
| 3,466,394 A | 9/1969 | French | |
| 3,752,904 A | 8/1973 | Waterbury | |
| 3,896,266 A | 7/1975 | Waterbury | |
| 3,988,715 A | 10/1976 | Mullan et al. | |
| 4,718,102 A | 1/1988 | Crane et al. | |
| 4,783,804 A | 11/1988 | Juang et al. | 704/245 |
| 4,817,156 A | 3/1989 | Bahl et al. | 704/256 |
| 4,819,271 A | 4/1989 | Bahl et al. | 704/256 |
| 4,908,865 A | 3/1990 | Doddington et al. | 704/272 |
| 5,023,912 A | 6/1991 | Segawa | 381/43 |
| 5,027,406 A | 6/1991 | Roberts et al. | 381/43 |
| 5,034,989 A | 7/1991 | Loh | 382/189 |
| 5,050,215 A | 9/1991 | Nishimura | 704/244 |
| 5,101,345 A | 3/1992 | MacPhail | 707/1 |
| 5,125,022 A | 6/1992 | Hunt et al. | 379/88 |
| 5,127,043 A | 6/1992 | Hunt et al. | 379/88 |
| 5,167,016 A | 11/1992 | Bagley et al. | 395/144 |
| 5,179,718 A | 1/1993 | MacPhail | 707/514 |
| 5,216,720 A | 6/1993 | Naik et al. | 704/272 |
| 5,255,310 A | 10/1993 | Kim et al. | 379/88 |
| 5,274,560 A | 12/1993 | LaRue | 364/444 |
| 5,283,833 A | 2/1994 | Church et al. | 381/41 |
| 5,297,194 A | 3/1994 | Hunt et al. | 379/88 |
| 5,303,299 A | 4/1994 | Hunt et al. | 379/88 |

(Continued)

FOREIGN PATENT DOCUMENTS

EP 0 319 193 A2 6/1989

(Continued)

OTHER PUBLICATIONS

L.G. Kersta; "Voiceprint Identification"; Bell Telephone Laboratories, Inc., Murray Hill, NJ; Nature; Dec. 29, 1962; pp. 1253-1257.

(Continued)

*Primary Examiner* — Qi Han

(57) ABSTRACT

A method and apparatus derive a dynamic grammar composed of a subset of a plurality of data elements that are each associated with one of a plurality of reference identifiers. The present invention generates a set of selection identifiers on the basis of a user-provided first input identifier and determines which of these selection identifiers are present in a set of pre-stored reference identifiers. The present invention creates a dynamic grammar that includes those data elements that are associated with those reference identifiers that are matched to any of the selection identifiers. Based on a user-provided second identifier and on the data elements of the dynamic grammar, the present invention selects one of the reference identifiers in the dynamic grammar.

22 Claims, 6 Drawing Sheets

U.S. PATENT DOCUMENTS

| | | | |
|---|---|---|---|
| 5,365,574 A | 11/1994 | Hunt et al. | 379/88 |
| 5,384,833 A | 1/1995 | Cameron | 704/275 |
| 5,418,717 A | 5/1995 | Su et al. | 364/419.08 |
| 5,452,397 A | 9/1995 | Ittycheriah et al. | 395/2.49 |
| 5,454,062 A | 9/1995 | LaRue | 395/2.63 |
| 5,455,889 A | 10/1995 | Bahl et al. | 704/236 |
| 5,465,290 A | 11/1995 | Hampton et al. | |
| 5,497,319 A | 3/1996 | Chong et al. | 364/419.02 |
| 5,499,288 A | 3/1996 | Hunt et al. | 379/88 |
| 5,502,774 A | 3/1996 | Bellegarda et al. | 382/159 |
| 5,504,805 A | 4/1996 | Lee | 379/67 |
| 5,509,104 A | 4/1996 | Lee et al. | 395/2.65 |
| 5,517,558 A | 5/1996 | Schalk | 379/88 |
| 5,519,786 A | 5/1996 | Courtney et al. | 382/159 |
| 5,526,465 A | 6/1996 | Carey et al. | 704/250 |
| 5,535,120 A | 7/1996 | Chong et al. | 364/419.03 |
| 5,566,272 A | 10/1996 | Brems et al. | 704/231 |
| 5,577,164 A | 11/1996 | Kaneko et al. | |
| 5,613,109 A | 3/1997 | Yamauchi et al. | |
| 5,623,578 A | 4/1997 | Mikkilineni | 704/255 |
| 5,623,609 A | 4/1997 | Kaye et al. | 704/1 |
| 5,640,490 A | 6/1997 | Hansen et al. | 704/254 |
| 5,642,519 A | 6/1997 | Martin | |
| 5,655,058 A | 8/1997 | Balasubramanian et al. | 704/236 |
| 5,675,647 A | 10/1997 | Garneau et al. | 380/20 |
| 5,675,704 A | 10/1997 | Juang et al. | 704/246 |
| 5,675,706 A | 10/1997 | Lee et al. | 704/256 |
| 5,677,989 A | 10/1997 | Rabin et al. | |
| 5,677,990 A | 10/1997 | Junqua | |
| 5,680,509 A | 10/1997 | Gopalakrishnan et al. | 704/270 |
| 5,680,511 A | 10/1997 | Baker et al. | 395/2.66 |
| 5,687,287 A | 11/1997 | Gandhi et al. | 704/247 |
| 5,729,656 A | 3/1998 | Nahamoo et al. | 704/254 |
| 5,745,555 A | 4/1998 | Mark | 379/93.03 |
| 5,748,840 A | 5/1998 | La Rue | |
| 5,754,695 A | 5/1998 | Kuo et al. | |
| 5,764,799 A | 6/1998 | Hong et al. | 382/225 |
| 5,769,527 A | 6/1998 | Taylor et al. | 362/85 |
| 5,774,628 A * | 6/1998 | Hemphill | 704/255 |
| 5,781,882 A | 7/1998 | Davis et al. | 704/221 |
| 5,794,042 A | 8/1998 | Terada et al. | |
| 5,797,123 A | 8/1998 | Chou et al. | |
| 5,799,269 A | 8/1998 | Schabes et al. | |
| 5,802,205 A | 9/1998 | Emico et al. | 382/187 |
| 5,806,040 A | 9/1998 | Vensko | |
| 5,818,952 A | 10/1998 | Takenouchi et al. | |
| 5,829,000 A | 10/1998 | Huang et al. | 704/252 |
| 5,832,063 A | 11/1998 | Vysotsky et al. | |
| 5,841,901 A | 11/1998 | Arai et al. | |
| 5,850,480 A | 12/1998 | Scanlon | |
| 5,870,492 A | 2/1999 | Shimizu et al. | |
| 5,875,108 A | 2/1999 | Hoffberg et al. | 364/146 |
| 5,889,897 A | 3/1999 | Medina | 382/309 |
| 5,897,616 A | 4/1999 | Kanevsky et al. | |
| 5,903,864 A | 5/1999 | Gadbois et al. | |
| 5,913,196 A | 6/1999 | Talmor et al. | |
| 5,937,385 A | 8/1999 | Zadrozny et al. | |
| 5,991,720 A * | 11/1999 | Galler et al. | 704/256 |
| 6,061,654 A * | 5/2000 | Brown et al. | 704/275 |
| 6,137,863 A * | 10/2000 | Brown et al. | 379/88.01 |
| 6,188,985 B1 * | 2/2001 | Thrift et al. | 704/275 |
| 6,208,965 B1 * | 3/2001 | Brown et al. | 704/246 |
| 6,965,864 B1 * | 11/2005 | Thrift et al. | 704/275 |

FOREIGN PATENT DOCUMENTS

| | | |
|---|---|---|
| WO | WO 96 10795 | 4/1996 |
| WO | 96 36042 | 11/1996 |

OTHER PUBLICATIONS

Joseph P. Campbell, Jr.; "Speaker Recognition: A Tutorial"; Proceedings of the IEEE, vol. 85, No. 9, Sep., 1997; pp. 1437-1462.

* cited by examiner

FIG. 2

|   | A | B | C | D | E | F | G | H | I | J | K | L | M | N | O | P | Q | R | S | T | U | V | W | X | Y | Z | 0 | 1 | ∘∘∘∘ 9 |
|---|---|---|---|---|---|---|---|---|---|---|---|---|---|---|---|---|---|---|---|---|---|---|---|---|---|---|---|---|---|
| A | .50 | | | | | | | | | | | | | | | | | | | | | | | | | | | | |
| B | | .50 | .05 | .05 | .05 | | | | | | | | | | | | | | | | | | | | | | | | |
| C | | .05 | .50 | .05 | .05 | | | | | | | | | | | | | | | | | | | | | | | | |
| D | | .05 | .05 | .50 | .05 | | | | | | | | | | | | | | | | | | | | | | | | |
| E | | .05 | .05 | .05 | .50 | | | | | | | | | | | | | | | | | | | | | | | | |
| F | .04 | | | | | | | | | | | | | | | | | | | | | | | | | | | | |
| G | | .04 | .04 | .04 | .04 | | | | | | | | | | | | | | | | | | | | | | | | |
| H | .04 | | | | | | | | | | | | | | | | | | | | | | | | | | | | |
| I | | | | | | | | | | | | | | | | | | | | | | | | | | | | | |
| J | .21 | | | | | | | | | | | | | | | | | | | | | | | | | | | | |
| K | .21 | | | | | | | | | | | | | | | | | | | | | | | | | | | | |
| L | | | | | | | | | | | | | | | | | | | | | | | | | | | | | |
| M | | | | | | | | | | | | | | | | | | | | | | | | | | | | | |
| N | | | | | | | | | | | | | | | | | | | | | | | | | | | | | |
| O | | | | | | | | | | | | | | | | | | | | | | | | | | | | | |
| P | | .06 | .06 | .06 | .06 | | | | | | | | | | | | | | | | | | | | | | | | |
| Q | | | | | | | | | | | | | | | | | | | | | | | | | | | | | |
| R | | | | | | | | | | | | | | | | | | | | | | | | | | | | | |
| S | | | | | | | | | | | | | | | | | | | | | | | | | | | | | |
| T | | .05 | .05 | .05 | .05 | | | | | | | | | | | | | | | | | | | | | | | | |
| U | | | | | | | | | | | | | | | | | | | | | | | | | | | | | |
| V | | .05 | .05 | .05 | .05 | | | | | | | | | | | | | | | | | | | | | | | | |
| W | | | | | | | | | | | | | | | | | | | | | | | | | | | | | |
| X | | | | | | | | | | | | | | | | | | | | | | | | | | | | | |
| Y | | | | | | | | | | | | | | | | | | | | | | | | | | | | | |
| Z | | | | | | | | | | | | | | | | | | | | | | | | | | | | | |
| 0 | | | | | | | | | | | | | | | | | | | | | | | | | | | | | |
| 1 | | | | | | | | | | | | | | | | | | | | | | | | | | | | | |
| 2 | | | | | | | | | | | | | | | | | | | | | | | | | | | | | |
| 3 | | .15 | .15 | .15 | .15 | | | | | | | | | | | | | | | | | | | | | | | | |
| ⋮ | | | | | | | | | | | | | | | | | | | | | | | | | | | | | |
| 9 | | | | | | | | | | | | | | | | | | | | | | | | | | | | | |

```
CONFUSION SET 1: AJK
CONFUSION SET 2: EBCDPTV
CONFUSION SET 3: SFX
CONFUSION SET 4: IROL
CONFUSION SET 5: MN
CONFUSION SET 6: W
CONFUSION SET 7: H
```

FIG. 6

| ACCOUNT NUMBER | CORRELATION DATA ELEMENT #1 | CORRELATION DATA ELEMENT #2 | CORRELATION DATA ELEMENT #3 |
|---|---|---|---|
| bs437w | BROWN | NJ | 07031 |
| ds437w | BASHAK | NY | 10311 |
| es437w | RASINKI | NY | 10311 |
| gs4g7w | HOWITT | CT | 12032 |
| gs4f7w | MEYERS | NJ | 07064 |
| gx437w | HOFFMAN | NY | 10112 |
| ps4f7w | ZWEIG | PA | 11011 |
| zx437w | GOLDBERG | NJ | 07042 |
| zx4p7w | FLANGAN | CA | 90102 |

CONCISE DYNAMIC GRAMMARS USING N-BEST SELECTION

CROSS REFERENCE TO RELATED APPLICATIONS

The present application is related to the following applications: U.S. patent application Ser. No. 08/763,382, filed Dec. 13, 1996, entitled "STATISTICAL DATABASE CORRECTION OF ALPHANUMERIC ACCOUNT NUMBERS FOR SPEECH RECOGNITION AND TOUCH-TONE RECOGNITION"; U.S. patent application Ser. No. 08/771,356, filed Dec. 16, 1996, entitled "CONSTRAINED ALPHA-NUMERICS FOR ACCURATE ACCOUNT NUMBER RECOGNITION"; U.S. patent application Ser. No. 08/909,199, filed Aug. 11, 1997, entitled "A CONFUSION MATRIX BASED METHOD AND SYSTEM FOR CORRECTING MISRECOGNIZED WORDS APPEARING IN DOCUMENTS GENERATED BY AN OPTICAL CHARACTER RECOGNITION TECHNIQUE"; U.S. patent application Ser. No. 08/909,200, filed Aug. 11, 1997, entitled "METHOD AND APPARATUS FOR PERFORMING AN AUTOMATIC CORRECTION OF MISRECOGNIZED WORDS PRODUCED BY AN OPTICAL CHARACTER RECOGNITION TECHNIQUE BY USING A HIDDEN MARKOV MODEL BASED ALGORITHM"; U.S. patent application Ser. No. 08/953,579, filed Oct. 17, 1997, entitled "METHOD AND APPARATUS FOR ACCESSING PRE-DEFINED GRAMMARS"; U.S. patent application Ser. No. 08/953,469, filed Oct. 17, 1997, entitled "METHOD AND APPARATUS FOR MINIMIZING GRAMMAR COMPLEXITY"; U.S. patent application Ser. No. 08/953,468, filed Oct. 17, 1997, entitled "METHOD AND APPARATUS FOR PERFORMING A GRAMMAR-PRUNING OPERATION"; U.S. patent application Ser. No. 08/975,587, filed Nov. 20, 1997, entitled "METHOD AND APPARATUS FOR PERFORMING A NAME ACQUISITION BASED ON SPEECH RECOGNITION"; U.S. patent application Ser. No. 08/975,588, filed Nov. 20, 1997, entitled "CONFUSION SET-BASED METHOD AND APPARATUS FOR PRUNING A PREDETERMINED ARRANGEMENT OF INDEXED IDENTIFIERS"; U.S. patent application Ser. No. 08/975,589, filed Nov. 20, 1997, entitled "CHECK-SUM BASED METHOD AND APPARATUS FOR PERFORMING SPEECH RECOGNITION"; U.S. patent application Ser. No. 08/982,678, filed Dec. 2, 1997, entitled "METHOD AND APPARATUS FOR ACCESSING A SYSTEM ON THE BASIS OF PLURAL MATCHING OPERATIONS"; U.S. patent application Ser. No. 09/018,449, filed Feb. 4, 1998, entitled "STATISTICAL OPTION GENERATOR FOR ALPHA-NUMERIC PRE-DATABASE SPEECH RECOGNITION CORRECTION"; and U.S. patent application Ser. No. 09/018,575, filed Feb. 5, 1998, entitled "A CONFUSION SET BASED METHOD AND SYSTEM FOR CORRECTING MISRECOGNIZED WORDS APPEARING IN DOCUMENTS GENERATED BY AN OPTICAL CHARACTER RECOGNITION TECHNIQUE".

BACKGROUND OF THE INVENTION

The present invention is directed to a method and apparatus for acquiring a pre-stored identifier based on at least one input identifier and, in particular, to a method and apparatus that acquires this pre-stored identifier by first generating N selection identifiers and selecting from these N selection identifiers the identifier that matches the desired pre-stored identifier.

The increasingly competitive nature of business, whether it occurs on a regional, national, or even international scale, has imposed on companies the incentive to seek out new avenues for achieving comparative advantage over their competitors. In pursuit of such advantages, companies seek ways to attract new customers and at the same time raise the satisfaction and value that existing customers already receive. In certain markets, one way to achieve this is through improving customer assistance. Since many companies have a large customer base that is oftentimes spread out over a vast geographic area, the only feasible way for a company to provide broad customer service access is to implement a communication network that can handle inquiries from customers. One way such customer service is implemented is a customer service center that can be remotely accessed by customers either on the telephone or through an Internet or other computer-based link.

Once a call is received at the customer service center, the next task is to identify who the customer is. This task is not without difficulty, especially in companies that have millions of customers. Usually, each customer is uniquely identified by an account number that is maintained on a database, and each account number is in turn associated with information that is pertinent to the particular customer for whom the account number was generated. For example, in a remote access merchandise center, each account number may be associated with not only a current merchandise order, but also with an historical record of purchases made by each customer. For purposes of this discussion, customer account numbers are included within a class of information referred to herein as identifiers; each identifier is a collection of numbers, letters, typographical characters, or any combination thereof. Moreover, the identifiers may be pronounced as words or on a character-by-character basis, the latter type of pronunciations being referred to as phonetic aggregations. In order to pair a caller with a particular account number (identifier), such remote access systems must first require the caller to enter his account number, either through a touch-tone keypad, or, more recently, by speaking into a voice input device that is coupled to speech recognition technology. After receiving an input account number, the system searches throughout the entire customer database for that one account number. Depending on the customer base, such a search can be time-consuming and can deplete processing resources that could otherwise be put to more efficient uses. Therefore, what is needed is a system that simplifies the manner in which a system can identify a user trying to gain access thereto.

SUMMARY OF THE INVENTION

The present invention is thus directed to a method and apparatus that simplifies the search for one of a plurality of pre-stored reference identifiers on the basis of at least one input identifier provided by a user. In short, this simplification is achieved by deriving a dynamic grammar from the global set of reference identifiers. As used herein, the term "grammar" refers to a group of data elements that have been arranged together according to a set of criteria, and the term "dynamic grammar" refers to a grammar that is formed in real-time during the interaction of system 100 with one or more users. The search for the identifier that uniquely identifies the user is accomplished with respect to this dynamic grammar. As a result, since the amount of reference identifiers associated with the data elements of the dynamic grammar will invariably be less than the complete set of reference identifiers, the search for the identifier that corresponds to the current user is simplified and its efficiency enhanced.

According to a first embodiment of the present invention, the present invention derives a dynamic grammar from a set of reference identifiers by generating a plurality of selection identifiers, comparing the plurality of selection identifiers with the set of reference identifiers to determine which selection identifiers are present in the set of reference identifiers, and selecting the dynamic grammar as comprising those data elements associated with the reference identifiers that match any one of the selection identifiers.

According to another embodiment of the present invention, the present invention accesses a selected one of a plurality of reference identifiers, in which each reference identifier is associated with at least one data element. The present invention accomplishes this access by generating a plurality of selection identifiers and then determining those reference identifiers that match any one of the selection identifiers. The present invention then creates a data element subset comprising those data elements associated with the reference identifiers that match any of the selection identifiers. The present invention then selects one of the reference identifiers on the basis of the at least one associated data element.

According to another embodiment of the present invention, the present invention comprises an apparatus for transferring a subset of data elements selected from a global set of data items from a first memory to a second memory, each data item of the global set being associated with a reference identifier. This apparatus comprises a processing device that is coupled to the first memory and to the second memory. Also coupled to the processing device is a reference identifier selection module, which includes means for causing the processing device to select, in accordance with a predetermined criterion, which data elements are to be present in the subset of data elements, and which also includes means for transferring the subset of data elements from the first memory to the second memory.

According to yet another embodiment of the present invention, the present invention comprises an apparatus for responding to at least one vocal input from a user. This apparatus comprises a speech recognizing device for producing a predetermined identifier in response to the vocal input and a processing device having an input for receiving the predetermined identifier from an output of the speech recognizer. In this apparatus, at least one memory is coupled to the processing device; this memory includes at least one reference identifier having a predetermined relationship to the predetermined identifier. The apparatus according to the present invention also includes means for providing the user with access to the reference identifier having the predetermined relationship to the predetermined identifier.

BRIEF DESCRIPTION OF THE DRAWINGS

FIG. 2 shows a confusion matrix for arranging a plurality of probabilities indicative of the likelihood that a particular character in an identifier was spoken by a user.

FIG. 3 shows a connectivity matrix that is used to derive a plurality of confusion sets from a particular confusion matrix.

FIG. 4 shows an exemplary plurality of confusion sets

FIG. 6 illustrates an exemplary arrangement of reference identifiers and associated correlation data elements that may be maintained in a database of the system of FIG. 1 or 7.

DETAILED DESCRIPTION

Figure 1:
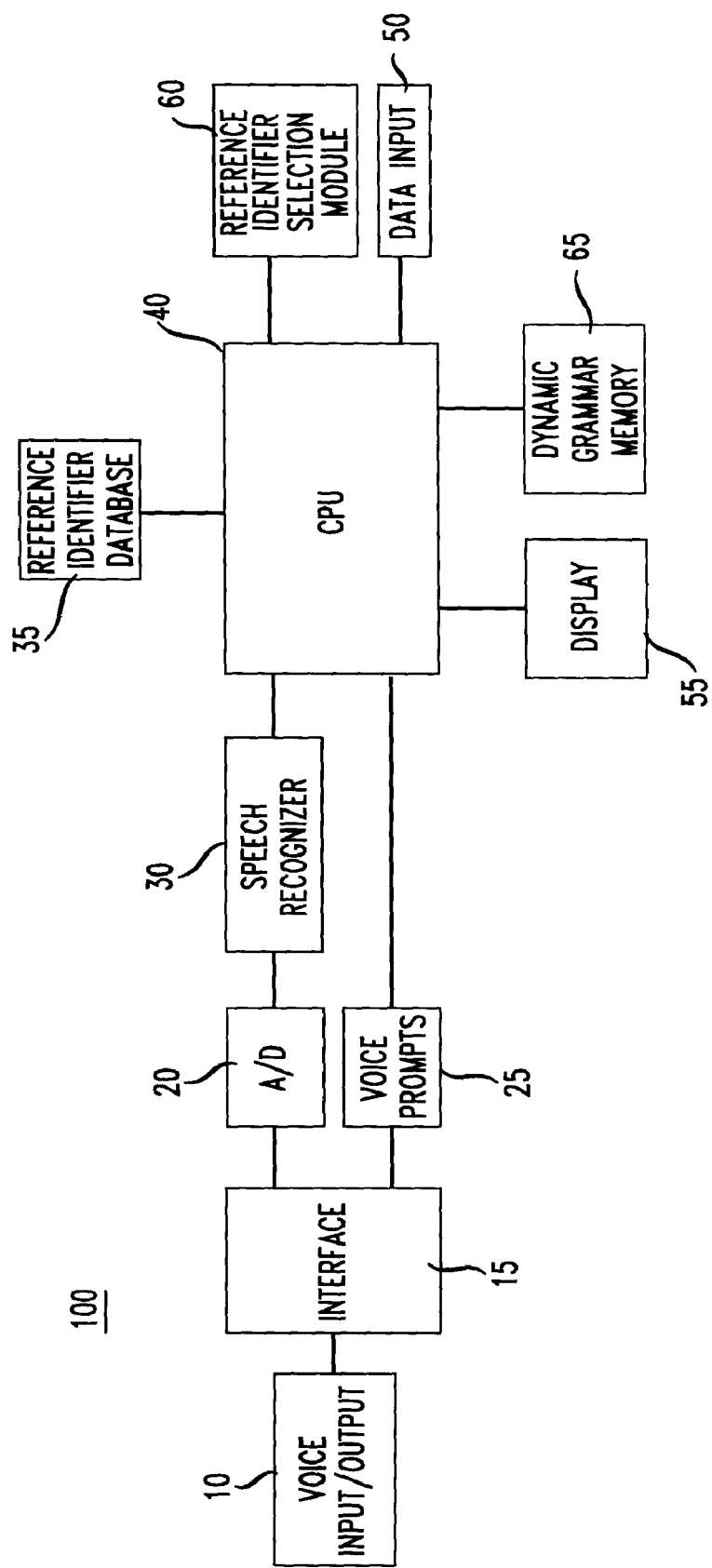
FIG. 1 illustrates a system constructed in accordance with the principles of the present invention.

FIG. 1 illustrates a system that implements an N-best dynamic grammar selection routine in accordance with an embodiment of the present invention. The system of FIG. 1 is merely an example of one kind of system that is capable of supporting this routine, and it should be appreciated that this routine is compatible with numerous other applications.

The system 100 of FIG. 1 includes a voice input/output device 10, which may comprise a conventional telephone or microphone. A user wishing to access a particular service provided by the system would be prompted to speak a predetermined identifier into voice input/output device 10. The term "identifier" refers to any arrangement of letters, numbers, or other typographical characters, regardless of whether such an arrangement comprises an actual word or a non-word. As explained above, the identifiers may be pronounced as a whole or on a character-by-character basis. Thus, if an identifier comprises "JOHN", a user may provide this identifier to device 10 either by pronouncing the whole word, or by pronouncing the characters individually, as in J-O-H-N. The voice signal provided by the user can be carried over a telephone line to a public telephone network interface 15, which interfaces the voice signal generated by voice input/output device 10 to the remaining components of the speech recognition system. Interface 15 may comprise a public-switched telephone network ("PSTN"). Of course, any wired or wireless connection could convey the voice signal to the speech recognition system. Moreover, system 100 need not be limited to a voice input/output device 10 that is remotely located from CPU 40; instead, system 100 may be configured as a unitary apparatus, such as a personal computer ("PC"). The system of FIG. 1 further includes an A/D converter 20, which converts the analog voice signal provided by interface 15 into a digital signal. A/D converter 20 supplies the digitized voice signal to speech recognizer 30, which may comprise, for example, a HARK 3.0 recognizer, which is manufactured by BBN Co., or a recognizer manufactured by NUANCE, Inc. After employing a recognition routine, for example, one that is based on the Hidden Markov Model, speech recognizer 30 provides as an output a set of N selection identifiers, which may or may not include a selection identifier that corresponds to the identifier that the user spoke into the device 10. As shall be explained shortly hereafter, the generation of N selection identifiers may be accomplished according to at least three different methods; one method, which can be performed by the NUANCE recognizer, uses a well-known algorithm based on the Hidden Markov Model. The other methods rely on confusion matrices and confusion sets, respectively, which shall be explained soon hereafter. Each selection identifier comprises digital information that is arranged according to a code format that is well-known in the field of speech recognizers. The set of N selection identifiers is provided to an input of CPU 40. As shall be explained hereafter, CPU 40 is configured to determine which of these N selection identifiers corresponds to the input identifier spoken by the user into device 10.

In short, the process of determining which of these N selection identifiers corresponds to the first input identifier involves CPU 40, operating in accordance with the instructions maintained in reference identifier selection module 60, comparing the N selection identifiers to the reference identifiers stored in database 35 in order to form a dynamic grammar that is maintained in dynamic grammar memory 65 and includes only those data elements that are associated with reference identifiers that match any of the selection identifiers. As used herein, the term "grammar" refers to a group of data elements that have been arranged together according to a set of criteria, and the term "dynamic grammar" refers to a grammar that is formed in real-time during the interaction of system 100 with one or more users. In database 35, each of the reference identifiers is associated with at least one correlation data element; once the dynamic grammar has been created, CPU 40 prompts the user to provide a second input identifier, one that is intended to match a correlation data element that is associated with one of the selection identifiers in the dynamic grammar. In order to prompt a user for information, system 100 includes a voice prompt device 25 which may comprise DIALOGIC telephone interface cards. CPU 40 causes voice prompt device 25 to issue voice inquiries to a user at voice input/output device 15. For example, in the case of prompting the user for a second input identifier, the voice prompt device 25 may issue an inquiry such as "Please tell me your mother's maiden name". Once a match is found to exist between the second input identifier and a correlation data element of the dynamic grammar, CPU 40 selects the selection identifier that is associated with the matched correlation data element as the true match for the first input identifier provided by the user. In addition to the components of FIG. 1 discussed above, system 100 also includes a data input device 50, such as a keyboard, a CD-ROM drive, or a floppy drive, and the system of FIG. 1 is also provided with a display 55.

As explained above, the speech recognizer 30 may generate the N selection identifiers in response to a first input identifier by employing any one of a plurality of methods, which shall now be described. The first method for generating N selection identifiers uses any suitable Hidden Markov Model-based algorithm to generate N possible identifiers on the basis of an input identifier. This first method may be accomplished by the NUANCE recognizer, which is well-known in the art. According to this method, the speech recognizer has been pre-programmed, in accordance with any suitable technique for doing so, to produce the N identifiers that most likely match the input identifier; these generated identifiers serve as the N selection identifiers. One such algorithm that can be used to generate these N selection identifiers is the Hidden Markov Model. In providing these N selection identifiers, speech recognizer 30 may produce identifiers of a fixed character length or of a variable character length, depending on the particular needs of the application at hand.

Figure 7:
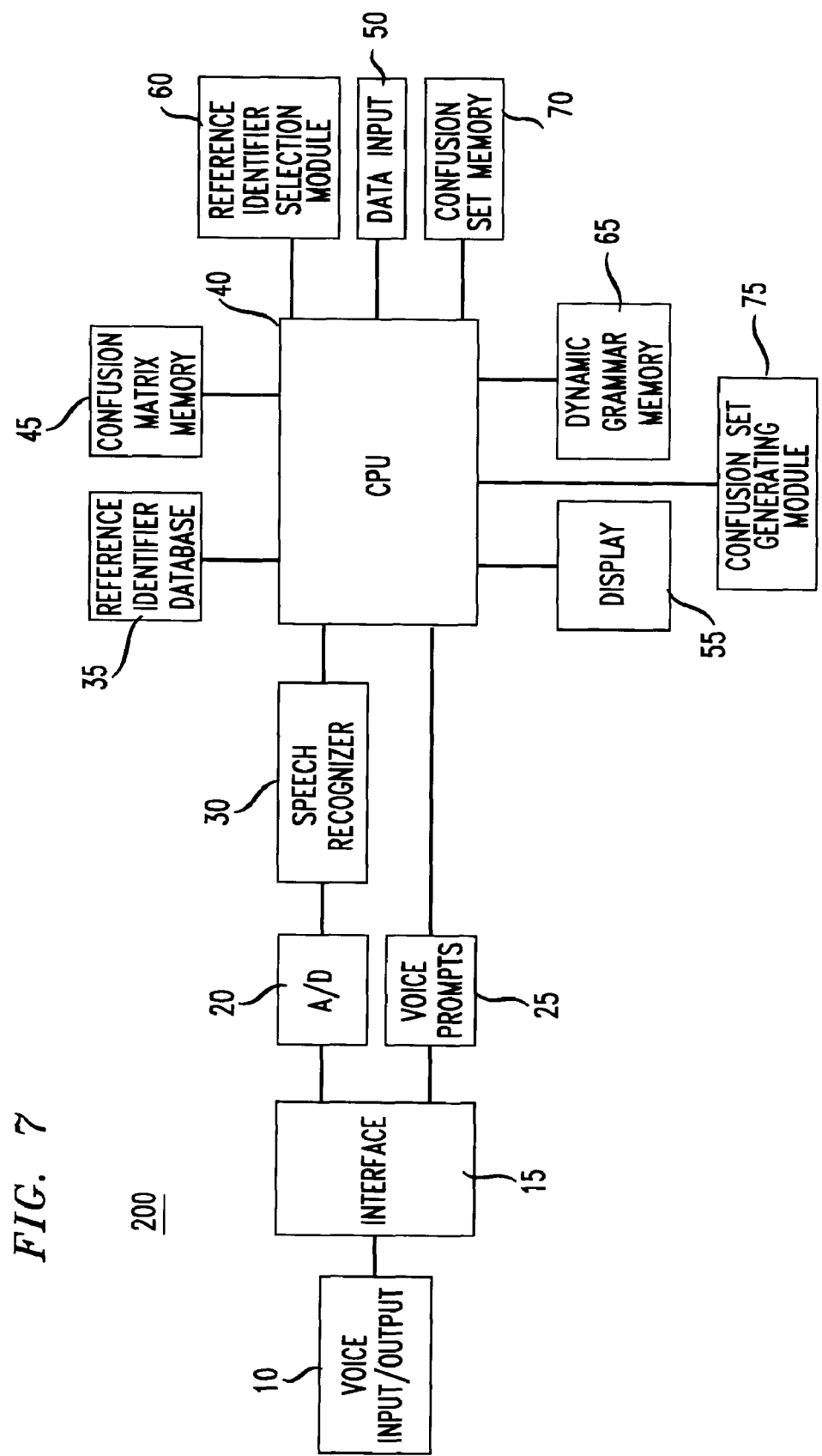
FIG. 7 illustrates a system that is in accordance with another embodiment of the present invention.

In order to explain the other two methods for generating N selection identifiers, the concept of confusion matrices and confusion sets will have to be explained first. The discussion regarding confusion matrices and confusion sets that is presented here is based on U.S. patent application Ser. No. 08/975,588 ("the '588 application"), which is incorporated by reference herein. Further, this discussion is presented within the context of FIG. 7 of the present application, which illustrates a system 200 that relies either on confusion matrices or confusion sets to generate the N selection identifiers. The choice of which method, either one based on confusion matrices or one based on confusion sets, to use to generate the N selection identifiers may be pre-programmed into module 60. In discussing system 200, elements that correspond to the same elements in FIG. 1 have been given the same reference character. The only elements that are new in FIG. 7 are confusion matrix memory 45, confusion set memory 70, and confusion set generating module 75.

The confusion matrix memory 45 stores a plurality of recognition probabilities arranged in matrix form. An example of a confusion matrix is illustrated in FIG. 2. In the example of FIG. 2, each recognition probability is provided in the form of a decimal value. Each recognition probability represents the probability that a particular character spoken by a user into voice input/output device 10 will be recognized by recognizer 30 either as the same character or as another character. For example, the confusion matrix is intended to provide a probability that, when "A" is spoken into device 10, the recognizer 30 will yield an "A", or a "B", a "C", etc., for that particular spoken character. Although in practice the confusion matrix stored in memory 45 would include entries for each intersection between each row and each column, for the sake of simplicity and ease of understanding, the confusion matrix of FIG. 2 includes a non-zero entry at only some of these row/column intersections. Thus, each blank entry in FIG. 2 is read as a zero; in practice, however, the entire matrix may be populated with recognition probabilities. Other possible confusion matrices need not be limited to just letters or numbers and may cover other characters as well, such as typographic characters.

The confusion matrix of FIG. 2 is read as follows: the vertical columns correspond to characters that are produced by recognizer 30. The horizontal rows correspond to characters that are spoken by a user into voice input/output device 10. Of course, the confusion matrix of FIG. 2 may be configured in reverse, in which the horizontal rows correspond to characters produced by recognizer 30, and in which the vertical columns correspond to characters that are spoken by the user. The values that are provided in the confusion matrix represent different probabilities. For example, based on the confusion matrix of FIG. 2, given that the character "A" is produced by recognizer 30, the probability that "A" was spoken by the user is 50%. The column for the character "A" also reveals a probability of 4% that an "F" was spoken when an "A" is recognized, a probability of 4% that an "H" was spoken when an "A" was recognized, a probability of 21% that a "J" was spoken when "A" is recognized, and a probability of 21% that a "K" was spoken when "A" is recognized. Characters that are pronounced similarly are more likely to be confused with each other, and the values that populate the confusion matrix of FIG. 2 reflect that observation. That is why, since "A" and "J" sound alike when pronounced, the recognition probability that a spoken "A" will be misrecognized by recognizer 30 as "J" (21%) is higher than the recognition probability that a spoken "A" will be misrecognized by recognizer 30 as an "F" (4%).

The particular probabilities that are provided in FIG. 2 are determined in advance through experimentation, and they are tailored to suit the particular recognizer 30 to be used. Thus, before a particular recognizer is to be used in the system of FIG. 1, a confusion matrix corresponding to that particular recognizer must first be populated. Thus, when a particular recognizer is to be used in the system of FIG. 1, a test group of persons provides pronunciations of each of the characters to be included in the confusion matrix, and the recognized output of recognizer 30 for each pronunciation is recorded. In order that the results of these tests incorporate the influence of the noise and bandwidth limitations that affect speech recognizers operating under real conditions, the vocal pronunciations of this test group of persons may be provided to the speech recognizer 30 over a telephone line. From these various "trial runs" of speech recognizer 30, the probabilities that characterize the recognition accuracy of the speech recognizer 30 are established, and these probabilities can be entered as a confusion matrix into memory 45 through data input device 50. Since different recognizers exhibit different recognition accuracies, if speech recognizer 30 is to be replaced with a different recognizer, a confusion matrix corresponding to the replacement recognizer may be entered into memory 45. Or, alternatively, memory 45 may store in advance a plurality of predetermined confusion matrices corresponding to different recognizers, so that when a replacement recognizer is implemented, the corresponding confusion matrix may be accessed by entering a command through input device 50. It should be noted that the probabilities of a confusion matrix need not be arranged in matrix form, but may be arranged as an array, or as any other data structure capable of associating a recognized and spoken character in terms of a probability.

Figure 3:
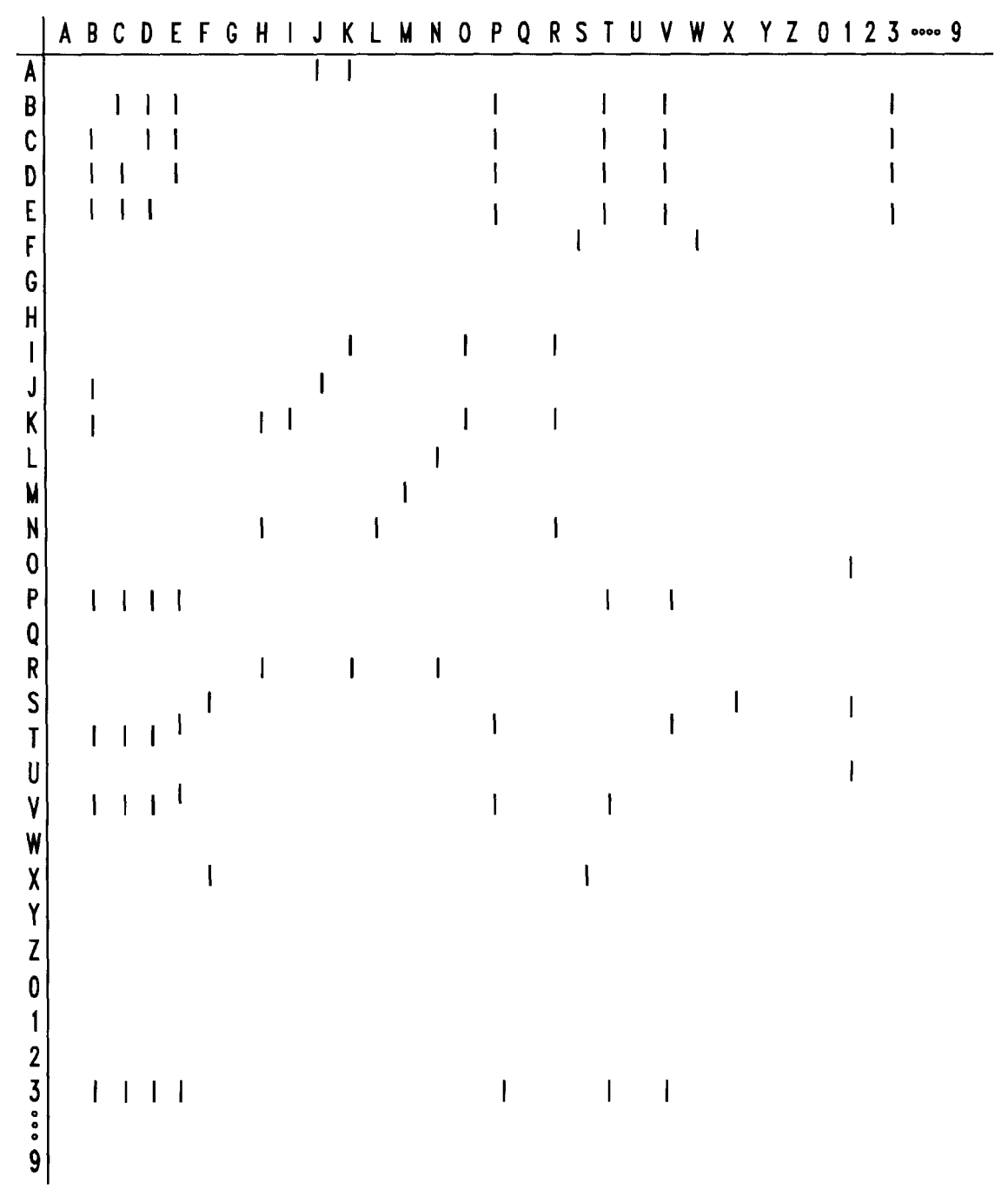

In order to discuss one manner in which a plurality of confusion sets are generated, reference is now made to FIGS. 3 and 4. FIG. 3 illustrates what is referred to as a connectivity matrix, from which a plurality of confusion sets may be obtained. An example of a plurality of confusion sets is shown in FIG. 4. For the sake of simplicity, these confusion sets do not include numerals, covering only letters instead. Each confusion set is intended to group together those characters that are most likely to be confused with each other. Within the context of a speech recognition system, the characters that are most often confused with each other are the characters that are pronounced the most similarly. The manner in which these confusion sets are generated is such that characters from different confusion sets have a relatively low probability of being confused with each other. As shall be explained in connection with FIG. 3, the determination of which characters should be grouped together may be based on the recognition probabilities arranged in the confusion matrix of memory 45. In FIG. 4, confusion set 1 groups together the characters "A", "J", and "K". Confusion set 2 groups together the characters "B", "C", "D", "E", "P", "T", and "V". Confusion set 3 comprises the characters "S", "F", and "X". Confusion set 4 comprises the characters "I", "R", "O", and "L". Confusion set 5 comprises the characters "M" and "N". Confusion set 6 comprises the character "W", and confusion set 7 comprises the character "H". For purposes of this discussion, the character content of each confusion set shall be referred to as a character collection. A character collection as used herein may include one or more characters.

Operating in accordance with the instructions provided by confusion set generating module 75 and in accordance with the confusion matrix provided in memory 45, CPU 40 performs the necessary calculations and procedures for generating the confusion sets, and once generated, these confusion sets are maintained in memory 70. The first step in generating the confusion sets involves generating a matrix based on the confusion matrix that corresponds to the speech recognizer 30 currently in use. In particular, each entry location (i.e., the intersection point of row X with column Y) of the newly generated matrix is populated with a value of 1 if the same entry location in the confusion matrix is populated with a recognition probability that is greater than a predetermined threshold. For those entry locations of the confusion matrix having recognition probabilities that are less than or equal to the threshold, the corresponding entry locations of the newly generated matrix receive a value of 0. The threshold is determined empirically according to any suitable method, and it reflects the recognition characteristics of the speech recognizer associated with the confusion matrix. The newly generated matrix that results from this procedure is a matrix that comprises only ones and zeroes. This matrix is then multiplied by itself a number of times equal to the amount of characters represented by the confusion matrix. Thus, if the confusion matrix covers only the alphabet, which includes twenty-six characters, then the ones-and-zeroes matrix is multiplied by itself twenty-six times. The product of this multiplication is referred to as a connectivity matrix, an example of which is illustrated in FIG. 3.

The distribution of characters among the various confusion sets depends on the distribution of ones in the connectivity matrix. Everywhere in the connectivity matrix that there is a "one," the characters of the associated row and column are included in the same confusion set. For example, in FIG. 3, the column corresponding to the character "A" includes a "one" at the rows corresponding to the characters "J" and "K". Thus, the characters "A", "J", and "K" are placed within one confusion set. For column "B", "ones" are associated with rows "C", "D", "E", "P", "T", and "V". Thus, the characters "B", "C", "D", "E", "P", "T", and "V" are included in another confusion set. This process is repeated until each character represented in the original confusion matrix is associated with a confusion set. The confusion sets of FIG. 4 represent one possible arrangement that the above-discussed process may yield.

It should be appreciated that this confusion set generation need not be performed after the system is put in practice, but instead may be accomplished before the system 200 begins interacting with users. Moreover, every time a new recognizer is installed, and consequently a new associated confusion matrix is activated, the system 200 requires that a corresponding new plurality of confusion sets be generated. Of course, each different plurality of confusion sets may be generated beforehand, so that if a new speech recognizer is implemented, the appropriate plurality of confusion sets may be activated by entering a command through data input device 50. Further, the above-discussed procedure is not the only way to generate a plurality of confusion sets; the present invention is intended to encompass any suitable process for grouping the most often confused characters with one another. Thus, for example, had the system 100 been programmed to store recognition probabilities according to a data structure other than a confusion matrix, the present invention would encompass whatever technique is suitable for that data structure for determining which groups of characters are most often confused with one another. Alternatively, the composition of each confusion set may be determined empirically by having a programmer or a group of persons select which characters should be grouped together based on how close they are perceived to be in view of their respective pronunciations.

With respect to the generation of N selection identifiers, what shall now be discussed is how a predetermined group of confusion sets may be used to generate these N selection identifiers. Assume that an identifier has been spoken into voice input/output device 10 and that in response to such an input, speech recognizer 30 has produced the recognized identifier "bsaew". In this example, identifiers can comprise letters only, but in practice, they may comprise other types of characters as well. In system 200, CPU 40, under the programmed instructions of module 60, goes to each character of this recognized identifier and substitutes that character with another character belonging to the same confusion set. For example, the first character, "b", belongs to confusion set 2 in FIG. 4. Thus, by replacing the letter "b" with each other letter of the confusion set, the system 200 can generate in this example up to six selection identifiers in this manner. After using the characters of confusion set 2 to serve as replacements for "b" in the first character position of this particular recognized identifier, system 200 goes to the next character, determines which confusion set it belongs to, and replaces that character with each of the other characters, if any, in this determined confusion set. This operation can be performed for every character position of the recognized identifier, or at least until N selection identifiers have been generated. This operation described above need not be limited to replacing a single character at a time. In addition, this operation may replace multiple characters at a time; thus, instead of replacing only "b" with "d" to produce the selection identifier "dsaew", this operation may be used to replace "bs" with "df" to produce a new selection identifier. In this multiple character operation, the confusion set to which each character that is to be replaced belongs is used to select the replacement characters for generating the selection identifier. Thus, in the above example, confusion set 2 would be consulted to select the replacement characters for "b", and confusion set 3 would be consulted to select the replacement characters for "s".

The next method for generating selection identifiers relies directly on the confusion matrix in memory 45. With respect to the above example, system 200 would consult the column of the confusion matrix that corresponds to the letter "b" and determine which of the values included therein exceed a predetermined threshold, which may be empirically established according to any suitable method. For example, if the threshold is set at 4%, then any letter in the "b" column that is associated with a confusion matrix value that exceeds this threshold would be used to replace the letter "b" in the first character position of the recognized identifier, thereby generating new selection identifiers. In this example, if the confusion matrix of FIG. 2 is used, the letters "c", "d", "e", "g", "p", "t", and "v" would be used as the replacement characters for the character position occupied by "b" in the recognized identifier. Notice that if numbers were allowed to occupy character positions of the identifier, the number 3 would also serve as a replacement character for "b" to create a corresponding selection identifier because it is associated in the exemplary confusion matrix of FIG. 2 with a value that is higher than the threshold of 4%. As with the confusion set-based operation, this operation based on confusion matrices may also be used to perform replacement operations on a multiple character basis. U.S. patent application Ser. No. 09/018,449, filed Feb. 4, 1998, entitled "STATISTICAL OPTION GENERATOR FOR ALPHA-NUMERIC PRE-DATABASE SPEECH RECOGNITION CORRECTION", which is incorporated by reference herein, also discusses the manner in which N identifiers may be generated based on the recognized output provided by a speech recognizer.

Besides the manner in which selection identifiers may be generated, a discussion of the data contents of database 35 is necessary as well before the overall operation of the present invention is described. As FIG. 6 illustrates, each reference identifier in database 35 is associated with at least one piece of information, which is referred to as a correlation data element. In the customer service context, such a data element may correspond to any combination of the following types of information: first name, last name, mother's maiden name, street address, city, state, zip code, age, etc. In the example provided by FIG. 6, each account number is associated with three correlation data elements, namely, one that includes the corresponding customer's last name, another that includes the corresponding customer's state of residence, and yet another that includes the corresponding customer's zip code. Although each account number in this example is associated with the same three types of correlation data items, this need not always be the case. Systems 100 and 200 are flexible enough to accommodate a database storage scheme that associates with each reference identifier correlation data elements that are different in kind and in number. Thus, for example, one reference identifier may be associated with only a last name correlation data element, while another reference identifier in database 35 may be associated with a maiden name correlation data element and a zip code data correlation data element.

Figure 5:
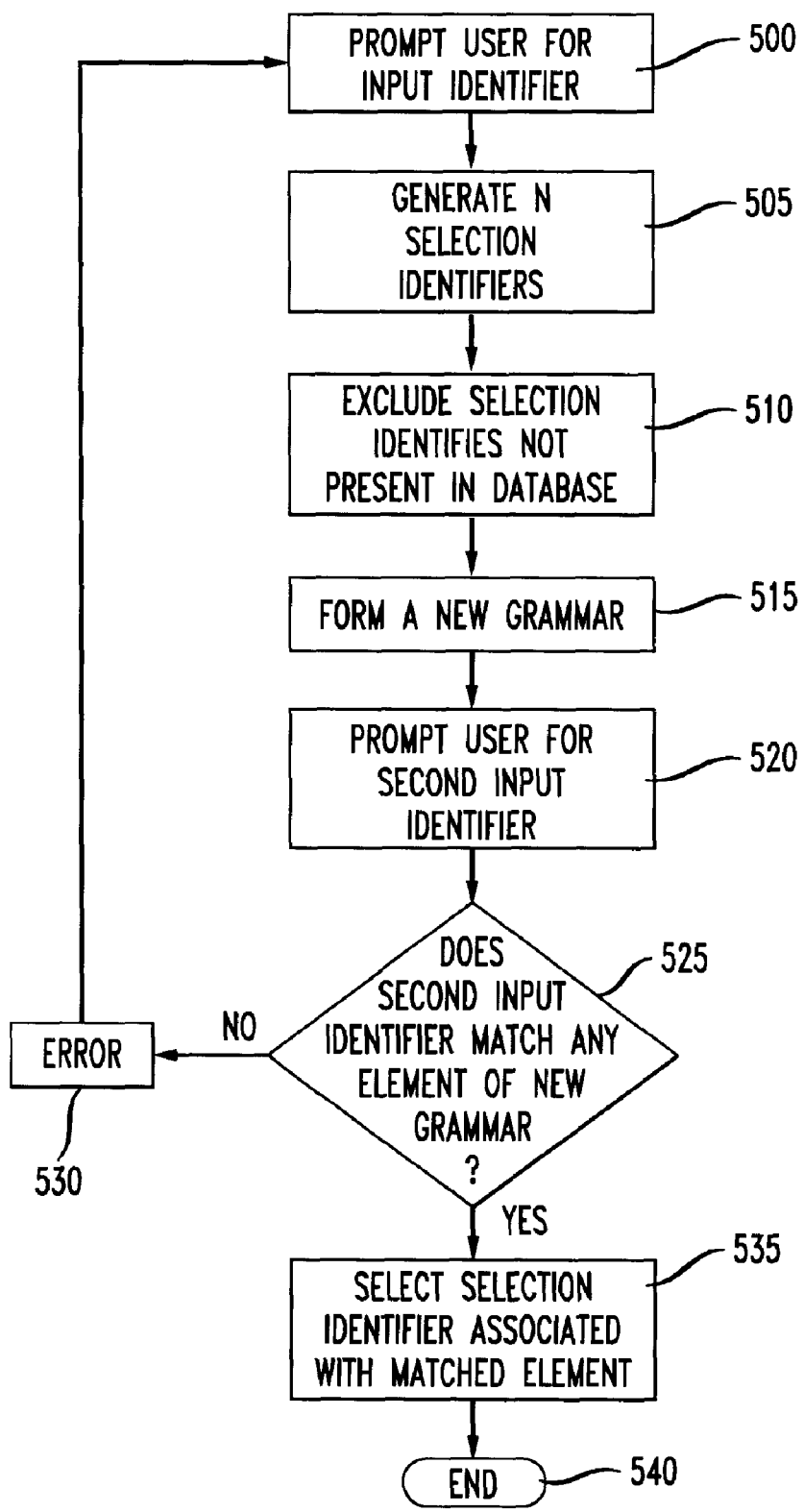
FIG. 5 illustrates a flow diagram that describes the operation of the system of FIG. 1.

For a more complete discussion of the operation of the systems 100 and 200, reference is now made to the flow diagram of FIG. 5, which presents an algorithm, maintained in reference identifier selection module 60, under which CPU 40 operates. The operation as represented in FIG. 5 shall be discussed within the context of a customer service system, in which a user dials into the system in order to obtain information or execute a transaction relating to his account. In particular, the operation begins when CPU 40 causes voice prompt device 25 to issue a request for the user to provide an input identifier (step 500). Within the customer service context, such an input identifier may comprise a customer account number. Assume that in this instance, the input identifier is "bs437w". As explained before, the analog electrical signal that embodies this vocally provided identifier is supplied to interface 15, which in turn supplies this signal to A/D converter 20. The output of A/D converter 20 comprises a digitized version of the analog signal received at the input thereof. This digitized signal is supplied to speech recognizer 30, which produces N selection identifiers in response thereto (step 505). If the system in question is system 100 of FIG. 1, then the selection identifiers are generated according to the Hidden Markov Model, as discussed above. If the system is system 200, then the N selection identifiers are generated in accordance with either the confusion set operation or the confusion matrix operation, as discussed above. Assume that in this example the N generated selection identifiers are as follows:

| bs437w | bs4g7w | bs4p7w | bx437w | bx4p7w |
| bx4z7w | ds437w | ds4g7w | ds4p7w | dx437w |
| dx4p7w | dx4z7w | es437w | es4g7w | es4p7w |
| ex437w | ex4e7w | ex4z7w | gs437w | gs4g7w |
| gs4t7w | gx437w | gx4e7w | gx4z7w | ps437w |
| ps4p7w | ps4t7w | px437w | px4e7w | px4z7w |
| ts437w | tx437w | tx4e7w | tx4z7w | zx437w |
| zx437w | zx4p7w | zx4p7w | zx4z7w | zx4z7w |

Speech recognizer 30 supplies these N selection identifiers to CPU 40, which compares these selection identifiers to the reference identifiers maintained in database 35. The reference identifiers in database 35 may comprise the entire customer account base for the particular institution that employs system 100. For example, if the institution is a credit card company, database 35 would store all of the customer accounts that are currently being serviced by the credit card company. In any event, once this comparison is performed, CPU 40 excludes those selection identifiers that are not found in the database 35 and forms a dynamic grammar that includes those correlation data elements that are associated with the reference identifiers that match any one of the selection identifiers. This dynamic grammar is stored in memory 65. Although each reference identifier, as illustrated in FIG. 6, may be associated with more than one type of correlation data element, each correlation data element of a reference identifier that matches a selection identifier need not be included in the dynamic grammar. The type of correlation data element that is included in dynamic grammar memory 65 may correspond only to the data element type that corresponds to the type of second identifier that shall be requested of the user. For example, as shall be discussed below, if the system 100, 200 is programmed to prompt the user for a second identifier comprising the maiden name of the user's mother, then for those reference identifiers that match a selection identifier, only the associated correlation data elements that embody maiden names will be provided to memory 65. Had the second identifier been required to be a zip code, then the zip code correlation data element of each reference identifier that matches a selection identifier would be provided to memory 65. Or if the type of second identifier that the user must provide is randomly chosen among the possible types of second identifiers, then all of the correlation data elements associated with each such reference identifier would be provided to memory 65.

As explained above, after system 100 has created a dynamic grammar based on the comparison of the N selection identifiers with the contents of reference identifier database 35, CPU 40 causes voice prompt device 25 to issue to the user an inquiry requesting a second input identifier, one that is intended to match a correlation data element associated with one of the reference identifiers (step 520). For example, the voice prompt device may issue a request for the maiden name of the user's mother, or for the zip code in which his residence is located. At this point, instead of producing N output identifiers in response to the second input identifier, speech recognizer 30 produces only a single identifier, which is referred to herein as a correlation identifier. Speech recognizer 30 may be programmed to produce N selection identifiers at step 505 and only one correlation identifier after step 525 by being programmed to do so in accordance with any suitable programming technique that is appropriate for speech recognition software. For example, speech recognizer 30 may still internally produce N identifiers in response to the second input identifier, but may be programmed at this point to select only the first of those N identifiers, which typically represents the "best" or "most likely" match for the input identifier. This second input identifier is referred to as the correlation identifier.

Once a correlation identifier has been produced, CPU 40 determines whether the present correlation identifier matches any correlation data element of the dynamic grammar in memory 65. For example, if the correlation identifier comprises the zip code 07031, CPU 40 compares this zip code with all of the zip code correlation data elements in dynamic grammar memory 65. If no match exists between the current correlation identifier and any correlation data item, CPU 40 causes voice prompt device 25 to issue an error message and re-prompts the user for a new first input identifier (step 530); on the other hand, if CPU 40 determines that a match exists between the correlation identifier and one of the correlation data items, CPU 40 extracts from memory 35 the reference identifier (i.e., account number) that is associated with the matched correlation data item (step 535). Although dynamic grammar memory 65 includes only correlation data elements, CPU 40 is still able to determine which reference identifier is associated with the correlation data element that matches the correlation identifier. CPU 40 can make this determination according to any suitable data storage scheme. One possible storage scheme involves "tagging" each data element that is transferred to memory 65: when a correlation data item is transferred from memory 35 to memory 65, it is "tagged" with a data field that identifies the address of the associated reference identifier's location in memory 35. Thus, when a correlation data element of memory 65 is determined to match the correlation identifier, CPU 40 accesses the data field "tag" of the correlation data element in order to determine the address location in memory 35 of the associated reference identifier.

In the example where the zip code 07031 was provided as the correlation identifier, CPU 40 would select the reference identifier bs437w as the reference identifier that matches the first input identifier originally provided by the user in step 500. If more than one identifier of the dynamic grammar is associated with the same matched correlation data item, CPU 40 may cause voice prompt device 25 to prompt the user with each identifier of the dynamic grammar that is associated with the matched correlation data item, at which point the user would indicate through voice input/output device 10 or any other suitable input means which of the prompted identifiers truly matches the one he originally spoke into device 10. After the reference identifier that correctly matches the first input identifier is selected, the user may enter into further interactions with the system 100, 200, or system 100, 200 may transfer the communication link with the caller over to another system that can execute particular user-initiated transactions on the basis, at least in part, of the matched reference identifier. For example, the user may wish to check his account balance, transfer funds between accounts, or pay bills.

The above described embodiments are illustrative of the principles of the present invention. Other embodiments could be devised by those skilled in the art without departing from the spirit and scope of the present invention. For example, instead of relying on speech recognition technology to communicate a user entry to CPU 40, system 100, 200 may be equipped with components that allow users to provide identifiers through a telephone keypad, a touch-screen input, or a remote point of sale ("POS") terminal.

The above described embodiments are illustrative of the principles of the present invention. Other embodiments could be devised by those skilled in the art without departing from the spirit and scope of the present invention.

What is claimed is:

1. A method for retrieving a reference identifier, the method comprising:
   generating, via a processing device, a plurality of selection identifiers from first user speech input received from a user, wherein the first user speech input comprises at least one non-alphanumeric character;
   comparing the plurality of selection identifiers with a set of reference identifiers to determine which reference identifiers in the set of reference identifiers match at least one of the plurality of selection identifiers;
   deriving a dynamic grammar by storing matching reference identifiers determined to match at least one of the plurality of selection identifiers together with data elements associated with the matching reference identifiers;
   generating at least one correlation identifier from second user input received from the user;
   comparing the at least one correlation identifier with the data elements to determine which data element matches the at least one correlation identifier; and
   retrieving the reference identifier associated with the data element determined to match the at least one correlation identifier.

2. The method of claim 1, wherein generating the plurality of selection identifiers further comprises:
   receiving an input identifier developed from the first user speech input; and
   deriving the plurality of selection identifiers in accordance with the input identifier.

3. The method of claim 2, wherein the at least one selection identifier is derived from the input identifier in accordance with a Hidden Markov Model algorithm.

4. The method of claim 2, wherein the at least one selection identifier is derived from the input identifier in accordance with one of a confusion matrix and a plurality of confusion sets.

5. The method of claim 1, wherein the plurality of selection identifiers represents an N-best hypothesis as a result of output from a speech recognition module.

6. The method of claim 5, wherein the N-best hypothesis is compared to the set of reference identifiers to identify matches for use in deriving the dynamic grammar.

7. The method of claim 1, further comprising:
after deriving the dynamic grammar, presenting a prompt to the user to obtain the second user input; and
processing the second user input with the dynamic grammar to identify a desired selection identifier from the plurality of selection identifiers.

8. An apparatus for retrieving a reference identifier, the apparatus comprising:
a processing device;
a first module configured to control the processing device to generate a plurality of selection identifiers from first user speech input received from a user, wherein the first user speech input comprises at least one non-alphanumeric character;
a second module configured to control the processing device to compare the plurality of selection identifiers with a set of reference identifiers to determine which reference identifiers in the set of reference identifiers match at least one of the plurality of selection identifiers;
a third module configured to control the processing device to derive a dynamic grammar matching memory reference identifiers determined to match at least one of the plurality of selection identifiers together with data elements associated with the matching reference identifiers;
a fourth module configured to control the processing device to generate at least one correlation identifier from second user input received from the user;
a fifth module configured to control the processing device to compare the at least one correlation identifier with the data elements to determine which data element matches the at least one correlation identifier; and
a sixth module configured to control the processing device to retrieve the reference identifier associated with the data element determined to match the at least one correlation identifier.

9. The apparatus of claim 8, wherein the first module is further configured to control the processing device to perform steps comprising:
i) receiving an input identifier developed from the first user speech input; and
ii) deriving the plurality of selection identifiers in accordance with the input identifier.

10. The apparatus of claim 8, wherein the third module is further configured to control the processing device to derive the plurality of selection identifiers from an input identifier in accordance with a Hidden Markov Model algorithm.

11. The apparatus of claim 10, wherein the third module is further configured to control the processing device to derive the plurality of selection identifiers from the input identifier in accordance with one of a confusion matrix and a plurality of confusion sets.

12. The apparatus of claim 8, wherein the plurality of selection identifiers represents an N-best hypothesis as a result of output from a speech recognition module.

13. The apparatus of claim 12, wherein the N-best hypothesis is compared to the set of reference identifiers to identify matches for use in deriving the dynamic grammar.

14. The apparatus of claim 8, further comprising:
means for, after deriving the dynamic grammar, presenting a prompt to the user to obtain the second user input; and
means for processing the second user input with the dynamic grammar to identify a desired selection identifier from the plurality of selection identifiers.

15. A non-transitory computer-readable storage medium storing instructions which, when executed by a processing device, cause the processing device to:
generate a plurality of selection identifiers from first user speech input received from a user, wherein the first user speech input comprises at least one non-alphanumeric character;
compare the plurality of selection identifiers with a set of reference identifiers to determine which reference identifiers in the set of reference identifiers match at least one of the plurality of selection identifiers;
generate a dynamic grammar by storing matching reference identifiers determined to match at least one of the plurality of selection identifiers together with data elements associated with the matching reference identifiers;
generate at least one correlation identifier from second user input received from the user;
compare the at least one correlation identifier with the data elements to determine which data element matches the at least one correlation identifier; and
retrieve the reference identifier associated with the data element determined to match the at least one correlation identifier.

16. The non-transitory computer-readable storage medium of claim 15, wherein generating the at least one selection identifier further comprises:
receiving an input identifier developed from the first user speech input; and
deriving the at least one selection identifier in accordance with the input identifier.

17. The non-transitory computer-readable storage medium of claim 16, wherein the plurality of selection identifiers are derived from an input identifier in accordance with a Hidden Markov Model algorithm.

18. The non-transitory computer-readable storage medium of claim 16, wherein the plurality of selection identifiers are derived from the input identifier in accordance with one of a confusion matrix and a plurality of confusion sets.

19. The non-transitory computer-readable storage medium of claim 15, wherein the plurality of selection identifiers from user speech represents an N-best hypothesis as a result of output from a speech recognition module.

20. The non-transitory computer-readable storage medium of claim 19, wherein the N-best hypothesis is compared to the set of reference identifiers to identify matches for use in deriving the dynamic grammar.

21. The non-transitory computer-readable storage medium of claim 15, wherein the dynamic grammar is derived for use in processing second user input received after receiving the user speech input.

22. The non-transitory computer-readable storage medium of claim 21, the instructions further comprising:
after deriving the dynamic grammar, presenting a prompt to the user to obtain the second user input; and
processing the second user input with the dynamic grammar to identify a desired selection identifier from the plurality of selection identifiers.

* * * * *